(12) United States Patent
Schultz

(10) Patent No.: US 8,345,402 B2
(45) Date of Patent: Jan. 1, 2013

(54) DEGAUSSING APPARATUS WITH HIGHLY UNIFORM MAGNETIC FIELD

(75) Inventor: Robert A. Schultz, Lincoln, NE (US)

(73) Assignee: Data Security, Inc., Lincoln, NE (US)

( * ) Notice: Subject to any disclaimer, the term of this patent is extended or adjusted under 35 U.S.C. 154(b) by 333 days.

(21) Appl. No.: 12/707,951

(22) Filed: Feb. 18, 2010

(65) Prior Publication Data

US 2011/0199712 A1    Aug. 18, 2011

(51) Int. Cl.
*H01H 47/00* (2006.01)
*H01F 13/00* (2006.01)
(52) U.S. Cl. ......... 361/143; 361/149; 361/150; 361/151
(58) Field of Classification Search .................. 361/143, 361/149–151
See application file for complete search history.

(56) References Cited

U.S. PATENT DOCUMENTS

| | | | |
|---|---|---|---|
| 5,969,933 A * | 10/1999 | Schultz et al. | ................. 361/149 |
| 7,064,948 B2 | 6/2006 | Schultz et al. | |
| 7,265,925 B2 * | 9/2007 | Ito | ................................... 360/66 |
| 7,324,321 B2 | 1/2008 | Olliges | |
| 2005/0141118 A1 | 6/2005 | Ito | |
| 2006/0023389 A1 * | 2/2006 | Ito | ................................. 361/143 |
| 2007/0019355 A1 | 1/2007 | Ito | |
| 2010/0302701 A1 | 12/2010 | Olliges | |

FOREIGN PATENT DOCUMENTS

| | | |
|---|---|---|
| JP | 2005-078713 | 3/2005 |
| JP | 2007-080483 | 3/2007 |
| JP | 2008-084371 | 4/2008 |

OTHER PUBLICATIONS

Kwon Y.; International Search Opinion and Report; PCT/US2011/024749 dated Sep. 22, 2011; 9 pages (corresponds to U.S. Appl. No. 12/707,951).
Proton T-4 Degausser flyer; 1 pg.; published before Feb. 18, 2010.
Proton T-4 Degausser datasheet, 1 pg.; published before Feb. 18, 2010.

* cited by examiner

*Primary Examiner* — Dharti Patel
(74) *Attorney, Agent, or Firm* — Fitch, Even, Tabin & Flannery, LLP

(57) ABSTRACT

Generation of an intense magnetic field to erase high coercivity magnetic media uses delivery of energy to a degaussing cavity. To conserve energy storage and delivery requirements and to obtain a desired magnetic strength generally uniformly within the cavity, strategic placement of supplemental turns at ends of the magnetic field generating coil wound around the cavity can promote uniformity. Construction of at least cavity ends from an adequate quantity of magnetically soft ferrous material can also promote uniformity. A combination of both approaches is possible.

17 Claims, 10 Drawing Sheets

DEGAUSSING APPARATUS WITH HIGHLY UNIFORM MAGNETIC FIELD

TECHNICAL FIELD

This invention relates generally to provision of magnetic fields and more particularly to the provision of magnetic fields for magnetic media degaussing.

BACKGROUND

A well known rule of thumb for a uniformly wound, circular cylindrical coil is that magnetic field strength at the winding ends approach half of the magnetic field strength at the center of the coil. Generally ovoid or rectangular-shaped wire windings made to receive rectangular-shaped magnetic media, such as computer memory devices like hard drives, suffer somewhat less field strength loss at the winding's ends. Two approaches to increasing the field strength at the ends of a coil include increasing the field strength at the center of the coil or increasing the coil length to be much greater than a degaussed medium's length; however, both approaches incur high energy storage and delivery costs.

Numerous prior art examples of bulk degaussers with magnetic field generating coils having more or less rectangular-shaped or ovoid windings with a tight, uniform pitch are known in the art. Nonuniform pitch windings have also been employed with noncircular coils to improve uniformity or to adjust electrical properties of the windings. Multiple windings have been used to gain magnetic strength or to provide directional variance by superposition of magnetic fields generated by individual windings.

The prior art of interposing a uniform winding with one or multiple gaps toward the middle of the windings works well for multi-filar or multi-wire windings stacked in parallel such that the effective turns pitch is shorter than the coil thickness. Introduction of gaps in windings where a filar has a more or less round or square aspect allows leakage magnetic flux that degrades uniformity. Such prior art multiple filar layers, however, increase the volume that needs to be magnetized.

Moreover, using multiple windings to allow magnetic field superposition always must increase the magnetic field volume significantly, which in turn requires increased energy storage and delivery requirements that increase with the square of magnetic strength. Increased volume also implies longer length of the coil wires and an increase in wasteful stray resistance over the wires that impacts quality factor. For example, if resistance is high enough to cause damping just over criticality, only a third of the energy stored in a capacitor can be delivered to generate a magnetic field. Other factors impacting the energy used include the saturation effects of nonlinear ferrous materials and stray resistive, capacitive, and hysteresis losses.

When applied to the task of degaussing hard disk drives, magnetic fields should be produced at a strength sufficient to erase all data stored on a respective drive. Hard disk drives currently have coercivities in excess of 5000 oersteds. In the near future, media will be produced that is designed for heat assisted magnetic recording, designed with patterned domains, or a combination of both with room temperature coercivity in excess of 10,000 oersteds. Magnetic field generators capable of generating a 20,000 oersted magnetic field intensity are becoming available, and may be incorporated with circuitry that can generate that strength in both axial directions of a coil. Generating such a magnetic field with uniformity sufficient to ensure erasure of the entire hard disk, however, has not been shown without having the drawbacks shown above.

Recent advances in the magnetic recording arts place less relevance on generating magnetic fields in multiple directions with respect to media. For one example, perpendicular media is formulated with a magnetically soft under-layer that is predisposed to erasure in response to exposure to any single magnetic field direction. For another example, media rotation confinement by parked heads is dubious in view of the likely action of strong externally applied magnetic fields on spindle motors. As a result, market acceptance is growing for bulk degaussers with unidirectional magnetic field generators, and windings can be produced to generate smaller and more uniform magnetic field volumes.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an example apparatus for applying a magnetic field to a data storage device includes a frame sized to accommodate a target device and a coil. The coil includes a first layer extending between first and second ends of the frame and a second layer consisting of a first coil portion at least in part overlapping the first layer at the first end and a second coil portion at least in part overlapping the first layer at the second end. A first soft ferrous member is disposed at least partially in the coil at the first end of the frame, and a second soft ferrous member is disposed at least partially in the coil at the second end of the frame.

So configured, coil turns are distributed to promote superposition of magnetic fields at the ends of a cavity provided for erasure of magnetic storage media. By another approach, the turns count and length of the noncircular magnetic field generating windings can be minimized while maintaining a high degree of magnetic field uniformity within a volume representative of a range of magnetic storage media. Magnetic field leakage beyond the ends of the coil is limited by placement of an adequate quantity of magnetically soft ferrous material at the coil ends, partially just within the coil ends and just beyond the cavity volume provided for magnetic storage media.

Figure 1:
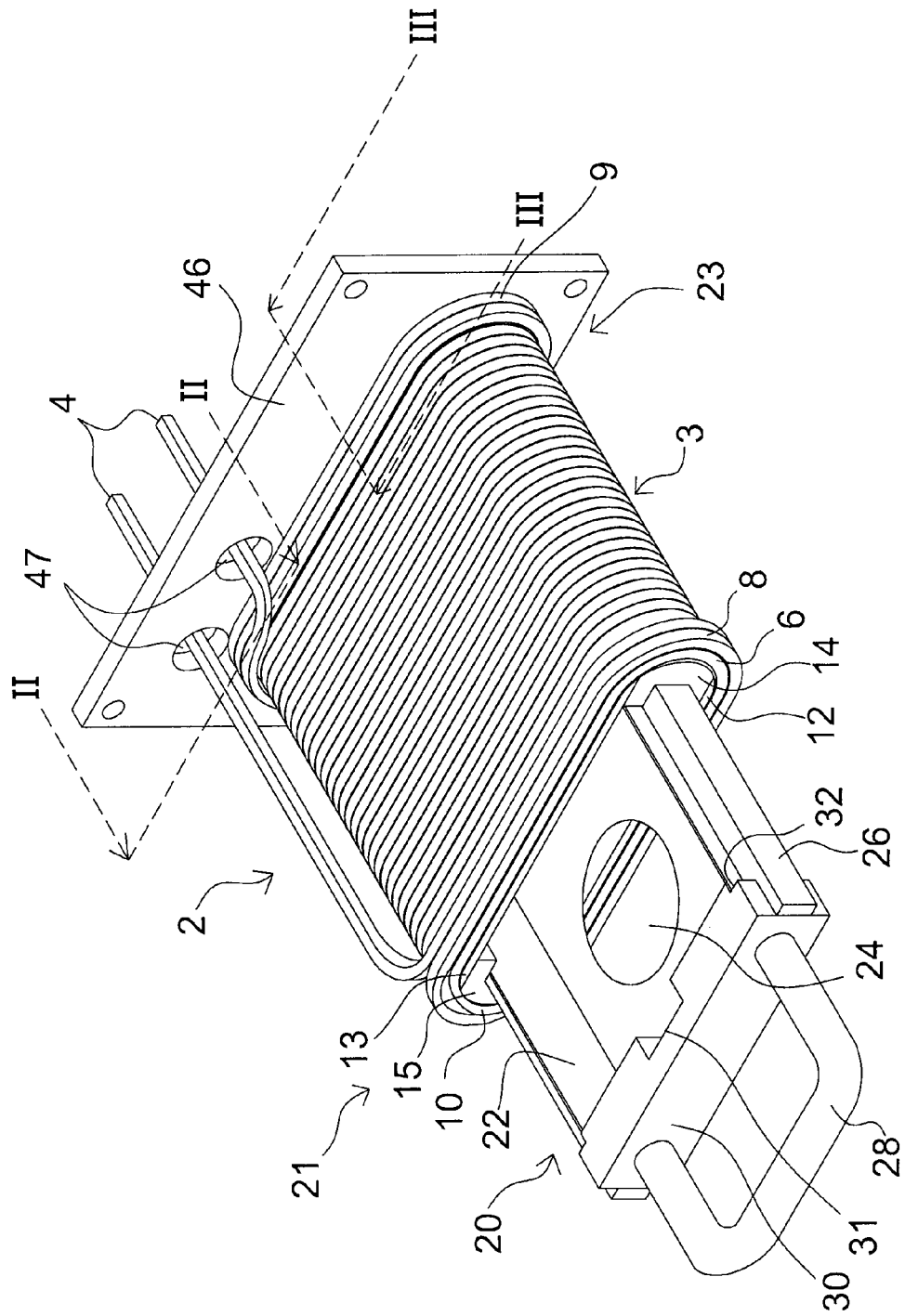
FIG. 1 comprises a perspective view of components of an example media cavity and ovoid-wound magnetic field generating coil in accordance with various embodiments.

These and other benefits may become clearer upon making a thorough review and study of the following detailed description. Referring now to the drawings, and in particular to FIG. 1, an illustrative apparatus for applying a magnetic field to a data storage device that is compatible with many of these teachings will now be presented. The apparatus includes a frame sized to accommodate a target device. In this example, the frame includes nonconductive members such as a bottom 12, a top 13, a side 14, and corresponding opposite side 15 to insulate a coil 2 from the degaussing cavity formed by those members. The frame defines a first end 21 and a second end 23. The coil 2 includes a first layer 3 extending between the first end 21 and the second end 23. The coil 2 includes a second layer consisting of a first coil portion 8 at least in part overlapping the first layer 3 at the first end 21 and a second coil portion 9 at least in part overlapping the first layer 3 at the second end 23.

By one approach, such as the illustrated example coil 2 of FIG. 1, all of the turns of the coil 2 are connected in series as a single wire continuous coil winding of constant wire gauge. In one example, the coil has two terminations 4, thirty six turns of the first layer 3 of square #6 American Wire Gauge (AWG) wire, and two turns per end of the second layer 8 and 9 wound more or less flush to each inner winding end. At least some slight winding irregularity typically occurs at the transition 10 between inner and outer turns. Adequate coils are possible with mixed gauges, parallel connections, shorted turns on the outside, fractional turns counts, separate means of energy delivery, and the like.

With respect to the second layer 8 and 9, the illustrated example shows the layer 8 and 9 as having short segments in a single layer, although arrangements such as single turns of more than one layer stacked on top of each other are possible. The outer short segments can be disposed to start nearly flush with the inner coil 3 ends, slightly inward of the ends, or slightly outward of the ends. To create the second layer 8 and 9, few turns of a square heavy gauge wire can promote more precise transitions with insulation to avoid shorting where relatively sharp edges of the wire cross while subjected to forces during magnetic operation. Few turns of heavy gauge wire can also promote winding of at least a few inner turns starting at one end, with uncoiled wire initially left free to subsequently wind outer turns over them.

In such an approach, wire resistance and coil inductance is minimized, thereby reducing the voltage to be applied to create a sufficiently strong magnetic field. The resultant at least transient operating currents can be provided by efficient, surge rated semiconductor switches such as thyristors and diodes as will be described below.

Figure 3:
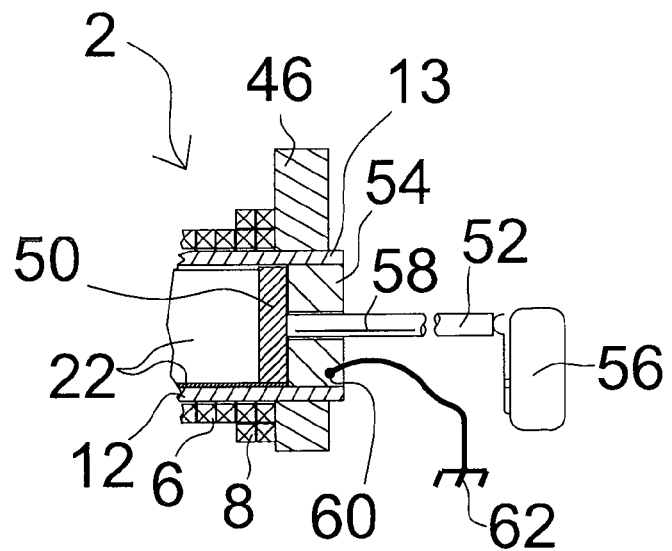
FIG. 3 comprises a partial cross sectional view through the height of the example apparatus FIGS. 1 and 2 including details of example safety grounding and interlocking apparatus.

Turning again to FIG. 1, a first soft ferrous member 30 is disposed at least partially in the coil 2 at the first end 21 of the frame. A magnetically equivalent second soft ferrous member 40 (FIG. 4) is disposed at least partially in the coil 2 at the second end 23 of the frame. For example the second ferrous member can be an exact minor imaged duplicate of member 30 including finger niche 31, can lack the niche, or can be composed of multiple pieces or layers 50 and 54 (FIG. 3). A soft ferrous member is made of a ferrite material such as steel, iron, or other alloy having a generally low magnetic coercivity and a generally high saturation flux density. In different approaches, the first ferrous member 30 and the second ferrous member 40 comprise at least one of steel or stacked laminations of silicon steel, although other suitable materials may be used.

In the example of FIG. 1, a media tray 20 is configured to slidably engage the frame. In such an approach, the first soft ferrous member 30 is disposed at a first end of the tray 20 such that when the tray 20 is disposed in the coil 2, the soft ferrous member 30 is disposed at least partially in the coil 2. In FIG. 1, the media tray 20 is shown partially extended from the cavity within the coil 2 toward a media load/unload position. The media tray 20 may include a tray handle 28 provided for tray extraction, which may be of a rigid type as shown or of a folding variety. The media tray 20 in this example has a U-formed stainless steel sheet 22 provided with hole 24 to facilitate media extraction from the tight cavity. Alternatively or in addition to the hole 24, a finger niche 31 can be provided to facilitate media unloading, so long as the removed material is insufficient to cause a significant deleterious effect of the magnetic function of the first soft ferrous member 30. Bars 26 provide strength to the tray's sides 22 against the impact of the degaussed media when a magnetic field is applied, and also are to resist compressive forces acting between the first soft ferrous member 30 and the second soft ferrous member 40 when a magnetic field is applied. For example, a 20,000 oersted magnetic field intensity will cause the force between the two soft ferrous members 30 and 40 comprising ¾ inch thick cold rolled steel to peak around half a ton. In this example, at that field intensity, thicker steel generally will not significantly improve magnetic field uniformity, and portions of thinner steel will begin to saturate and disrupt uniformity but only of a few percent toward a thickness of half an inch. Interlocking the bars 26 with the two soft ferrous members 30 and 40 can thereby provide bracing against the compressive forces during the application of a magnetic field given the strong attractive forces acting on the ferrous members. So configured, the soft ferrous members attached to the media tray 20 can provide a "blast shield" for protection against flying debris within the cavity during application of the magnetic field, reducing the need for additional doors or shields, for example, at the opening to the cavity. The bars 26 can also provide rails for extension of the tray 22 from the frame sides 14. By one approach, the bars 26 may be formed from stainless steel or other suitable material.

A nonconductive mounting plate 46 attached at the second end 23 to the frame members 14 and 15 can serve as a bobbin end for the frame. The plate 46 may include holes 47 for passage of the winding terminations 4, and additional holes in the plate 46 can facilitate mounting the coil 2 within a larger apparatus. The plate 46 may be cut out as needed to accept the entire outline of the soft ferrous member 40 (see FIG. 2 and FIG. 4). A similar plate not shown can attach at the first end 21 to the frame members 14 and 15 and be provided with a cutout for passage of the media tray 20.

Figure 2:
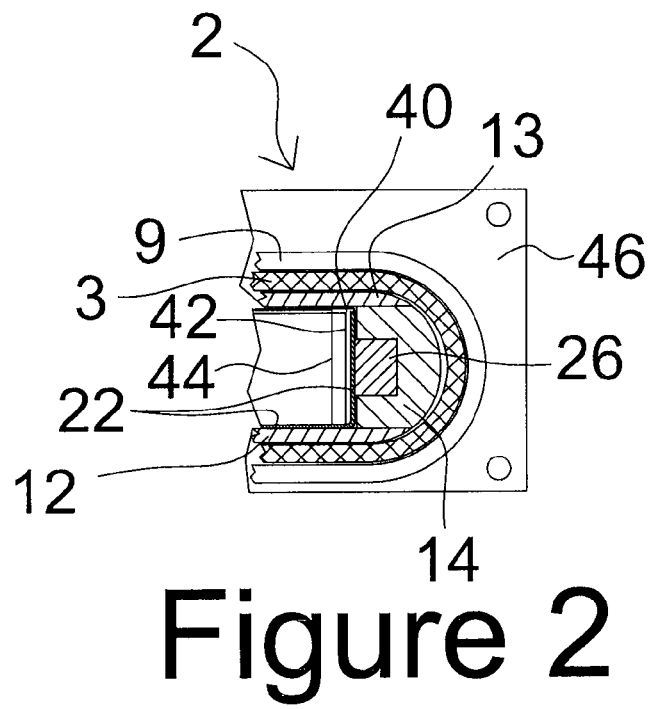
FIG. 2 comprises a partial cross sectional view through one side of the example apparatus of FIG. 1.

With reference to FIG. 2, the media tray 20 may include clearances for assembly, tray operation and media insertion. A first media outline 42 represents a standard DLT® tape cartridge form factor pushed toward the side not shown of the cavity defined by the example tray 20 walls of bent stainless steel sheet 22. A second, slightly taller media outline 44 represents a standard hard disk drive form factor pushed toward the side not shown of the cavity defined by the example tray 20 walls of bent stainless steel sheet 22.

With reference to the example of FIG. 3, the second soft ferrous member 40 can comprise two pieces 50 and 54. In this example, soft ferrous member 50 attached to the media tray 20 to form a rear wall. An additional, relatively thick soft rear ferrous member 54 attaches to the frame. The relative thicknesses of the two ferrous members 50 and 54 are arbitrary and can be interchanged. The total thickness of the two ferrous members 50 and 54 can be approximately equivalent to the thickness of forward ferrous member 30, which is sufficient to prevent substantial magnetic saturation. As with forward ferrous member 30, at least a portion of the combined or one piece ferrous member 50 and 54 extends into the second end 23 of the coil 2 during magnetic field generation. The soft ferrous members' penetrations provide surface area to collect more flux outside the tray, thereby reduce magnetic flux leakage and improving field uniformity at the ends of the cavity within the coil 2.

Generally speaking, cold rolled steel is known to saturate around a magnetic flux density of 2 teslas. Therefore, for generation of a magnetic field of 2 tesla strength inside the media tray 20, the steel end pieces need not be very thick to supplement the superposition benefits of the turns of the second layer 8 and 9. For much greater magnetic field strength, the ferrous member thickness should correspondingly increase so portions inside the coil 2 can collect flux that flows out of the oversaturated portions of the ferrous members. For generation of 2.5 to 3 tesla fields, the application of half inch thick steel to the coil ends improves field uniformity, but additional structural support may be added to resist attractive forces. Three-quarters inch thick steel, for example, can provide additional structural strength while slightly improving field uniformity.

With reference again to FIG. 3, a hole provided through the rear ferrous member 54 allows passage of a plunger rod 52, which may have a partial split 58. The plunger rod 52 may be firmly attached to the second rear soft ferrous member 50 or spring loaded to be biased toward contact with the second soft ferrous member 50. By another approach, the plunger rod 52 is attached to or spring loaded toward contact with the frame or media tray 20, passing through the second soft ferrous member 50. In this approach, the plunger rod can be comprised a soft ferrous material to compensate for the hole.

So configured, the rod 52 allows removal of the media tray 20 from the cavity. Other retention and/or extraction methods may be employed. By another approach, the attached rod 52 can have sufficient length and a mushroom head that allows full media tray 20 extension for loading but prevents media tray 20 removal and possible loss.

With continuing reference to the example of FIG. 3, an actuation member such as the rod 52 is connected to media tray 20 and configured to engage a switch 56, wherein the switch 56 is configured to allow electrical operation of the coil 2 when engaged by the actuation member. For example, the switch 56 is positioned to be activated by the rod 52 when the media tray 20 is fully inserted to provide a safety interlock function. The switch 56, in one approach, provides for a simple control scheme that automatically turns on a power supply to energize energy storage components upon insertion of the media tray 20 and to trigger activation of energy delivery components on detection of a predetermined stored energy level. Any arrangement of the rod 52 or other actuation element and location of the switch 56 may be employed.

In various approaches, the switch 56 can be a light action limit style switch as shown or any variety of momentary contact switch, optical interrupter, other non-contact sensor, a push-on/push-off switch, or a mechanically latching push-on switch provided with automatic unlatching upon receipt of an external signal. For example, a spring loaded self latching solenoid that acts on a momentary switching means can be made to automatically unlatch upon receipt of some portion of the leakage magnetic flux from the coil 2 during operation.

A safety grounding element can be provided as well. In various approaches, conductive rods 52 or the like can be expanded at split 58 to encourage contact with other elements of the apparatus to allow grounding of the apparatus through the conductive rod 52. By another approach, an electrical connection 60 can be made to a fixed conductive ferrous member 54 as shown, or to a conductive bushing forced into a nonconductive member of the frame. In such an approach, an opposite electrical connection is made to a safety ground such as chassis 62 to render the media tray 20 electrically inert. Such safety grounding can allow portions of the insulating frame to be made thinner while maintaining an acceptable degree of operator safety.

In operation, a method of applying a magnetic field to a target device includes receiving a target device in a frame sized to accommodate the target device, where the frame defining a first end and a second end. The method also includes applying a current to a coil disposed around the frame, wherein the coil includes a first layer extending between the first end and the second end and a second layer consisting of a first coil portion at least in part overlapping the first layer at the first end and a second coil portion at least in part overlapping the first layer at the second end. In this case, the coil applies a substantially uniform magnetic field to the target device.

Referring again to FIG. 1, an example approach to a design of the media cavity allows for clearance of media features sometimes extending slightly beyond a standard 5.75 inch hard drive depth with distance provided between the first soft ferrous member 30 and the second soft ferrous member 40 at around 6.00 inches. Allowing for wire coating and for slightly less than perfect coil turn packing, the length of the coil 2 equals about 6.3 inches. The cutout features 32 of the first soft ferrous member 30 allows it to extend half the difference between the media tray 20 interior dimension and the winding length into the front end of the coil 2 during magnetic field generation. In this approach, details of the soft ferrous members such as the cutout 32 have insignificant impact on the uniformity of the produced magnetic field. Therefore, the soft ferrous members can vary in shape to suit construction requirements for various applications.

Figure 4:
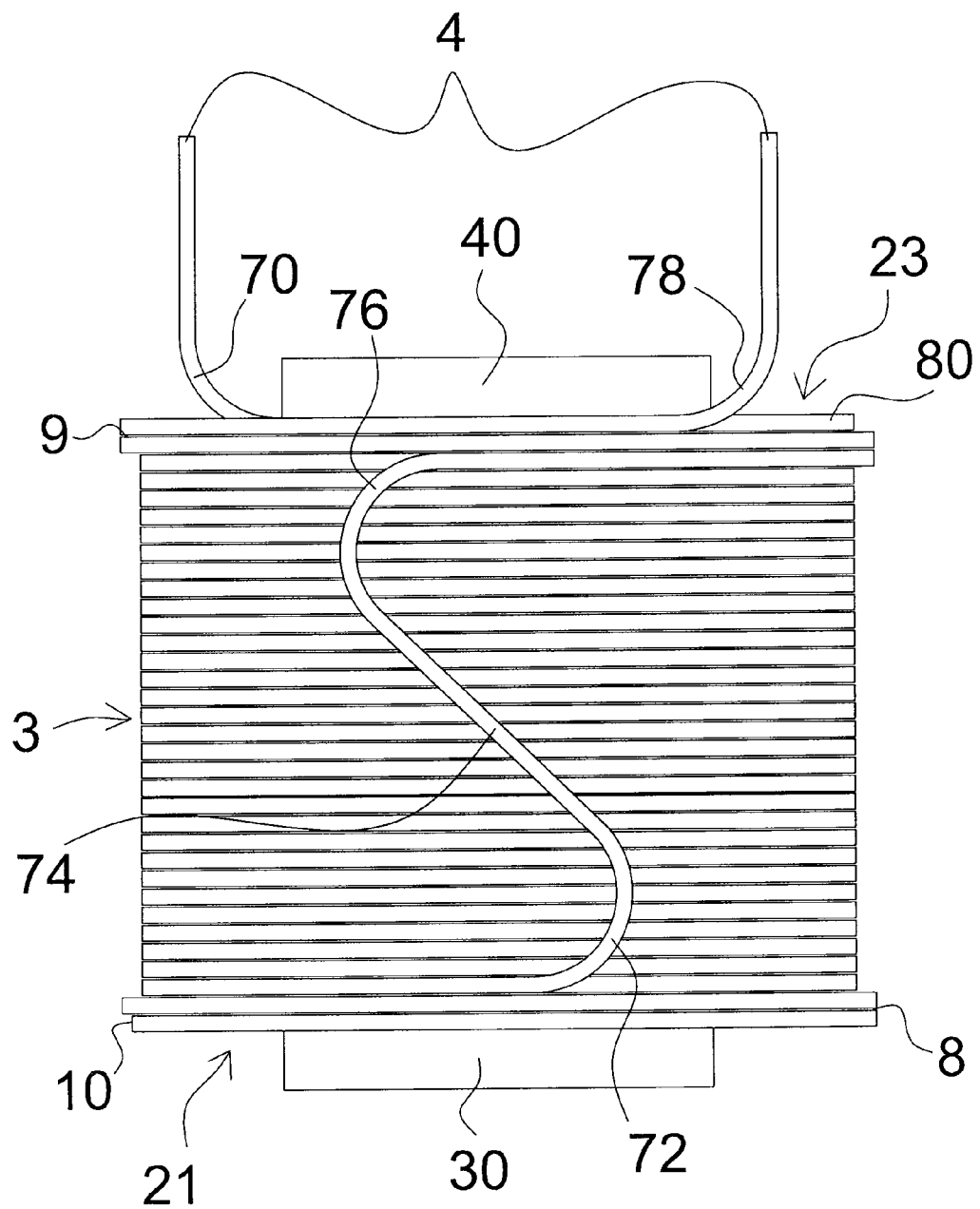
FIG. 4 comprises a top view of an example ovoid-wound magnetic field generating coil in accordance with various embodiments.

Referring to FIG. 4, one example operational arrangement of magnetic circuit elements can be seen. The magnetic field produced by the inner coil first layer 3 superimposes with magnetic fields produced by the outer end second layer 8 and 9. The soft ferrous members 30 and 40 are approximately symmetrically inserted part way into the coil 2 at the frame ends 21 and 23 to collect magnetic flux exiting the coil 2 at the frame ends 21 and 23 and to redirect it into the media cavity between the soft ferrous members 30 and 40 such that a highly uniform magnetic field strength of minimum energy can be contained and applied to a degaussed medium or media.

Figure 5:
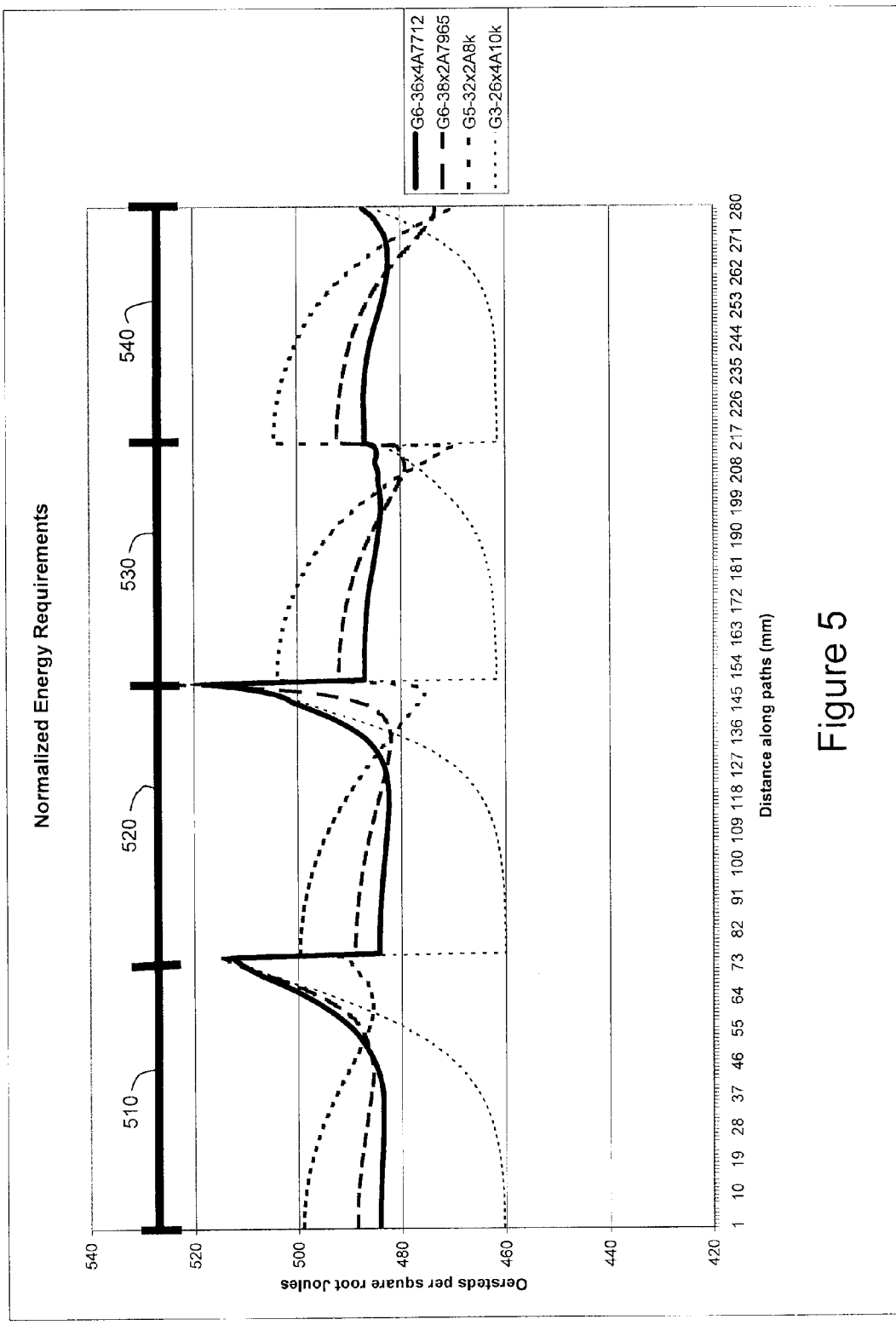
FIG. 5 comprises a representative family of normalized simulated performance curves for various example embodiments of the invention.

The winding sequence for the arrangement of FIG. 5 is as follows. Starting at one of the wire terminations 4, a first bend 70 of the wire leads into the inner layer 3 at the second end 23. Then, the inner layer 3 can be wound completely up to a transition 10 at the first end 21. Next, the outer turns of the second layer 8 can be wound up to a second bend 72, which leads into an approximately straight and perpendicular transition segment 74 from near the first end 21 toward the second end 23. A third bend 76 in the wire leads into the outer second layer 9 at the second end 23. Finally, a fourth bend 78 leads out of layer 9 toward the second of terminations 4.

Making the transition segment 74 somewhat diagonal as shown can help compensate from partial turns at exit and entry points, such as the inner turn portion 80 at the lead out bend 78. In practice, any coil has a degree of helical character that can be made to cover up that inner turn portion 80. In practical applications, such minor adjustments for the sake of manufacturability, symmetry or appearance generally have an insignificant effect on the magnetic properties of the given device.

Figure 6:
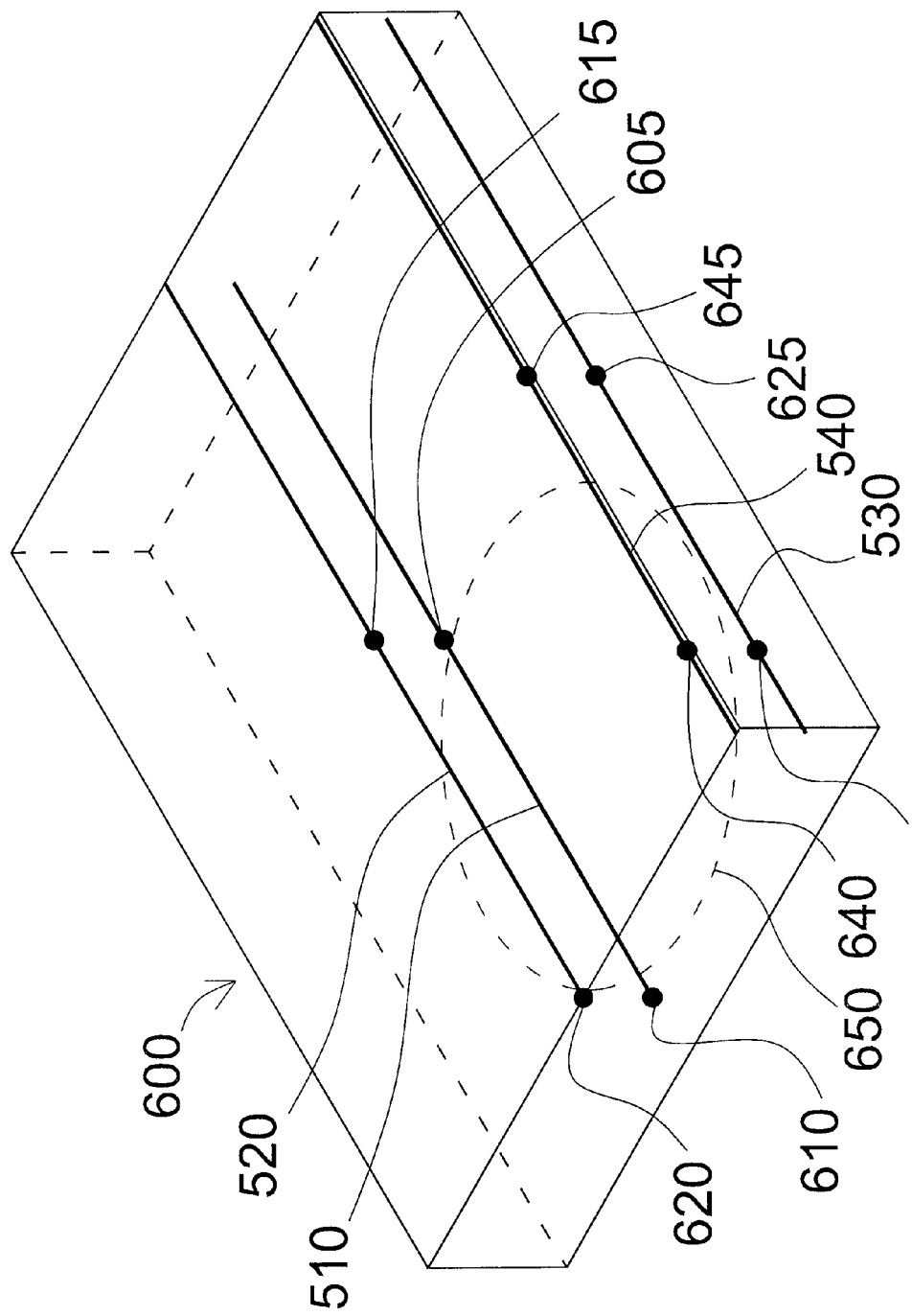
FIG. 6 comprises a perspective view of an example media cavity showing the lines along which the simulations of FIG. 5 were calculated.

Magnetic field simulations of four different example approaches are compared in FIG. 5, which plots the magnetic field profiles for the four approaches where the soft ferrous members are applied at the coil ends in the same manner for each approach. Such magnetic field simulations can be done by those of skill in the art. Each profile consists of simulations along four segments of an example media cavity 600 described with reference to FIG. 6: (1) a 3 inch (75 mm) segment 510 extending from the cavity geometric center 605 to the front (or rear) face geometric center 610, almost touching the inner face of a ferrous end member; (2) a 3 inch (75 mm) segment 520 extending from the geometric center 615 of the cavity top (or bottom) toward the cavity front 620 (or rear); (3) a 2.6 inch (65 mm) segment 530 extending from the geometric center of a cavity side face 625 toward the front 630 (or rear) edge, avoiding the media-less outer front (and rear) edge; and (4) a 2.6 inch (65 mm) segment 540 extending from the mid-point of a cavity depth edge 635 toward the front (or rear) corner 640, avoiding the media-less cavity corner. An example hard drive platter periphery 650 will likely approach the cavity front 610 and the cavity front edge 620, but practical platter sizes will likely not extend to the extreme corner of the cavity edge along the segment 530 and the segment 540. For each path, a minimum in the magnetic field can be determined, and the energy required to produce a 20,000 oersted magnetic field at that minimum point can be calculated.

The four approaches are named after wire gauge (Gn, where G6 stands for a #6 AWG wire used for the coil), inner and total outer turns (nn×n, where 36×4 stands for 36 inner coil turns and 4 outer coil turns for the coil), and the approximate current needed to generate a minimum field intensity of 20000 oersteds (Annnn or Annk, where A7712 means a 7712 Amp current is needed to provide the minimum field intensity). For example, 482 oersteds per square root Joules is the minimum reading for the G6-36×4 approach. Assuming a 20000 oersted field, one can determine using the following formula: $(20000/\sim 482)^2$=about 1720 joules, that about 1720 joules is the minimum energy needed to create a minimum magnetic field intensity for the given approach.

Analysis of the graphs of FIG. 5 demonstrate that despite performance variations due to the minor differences in configuration, the worst approach requires only 1890 joules (10% greater than the best of the shown approaches) to generate 20000 oersteds throughout the degaussing volume. Accordingly, a wide range of design changes within the teachings of this disclosure can provide reasonable performance.

Figure 7:
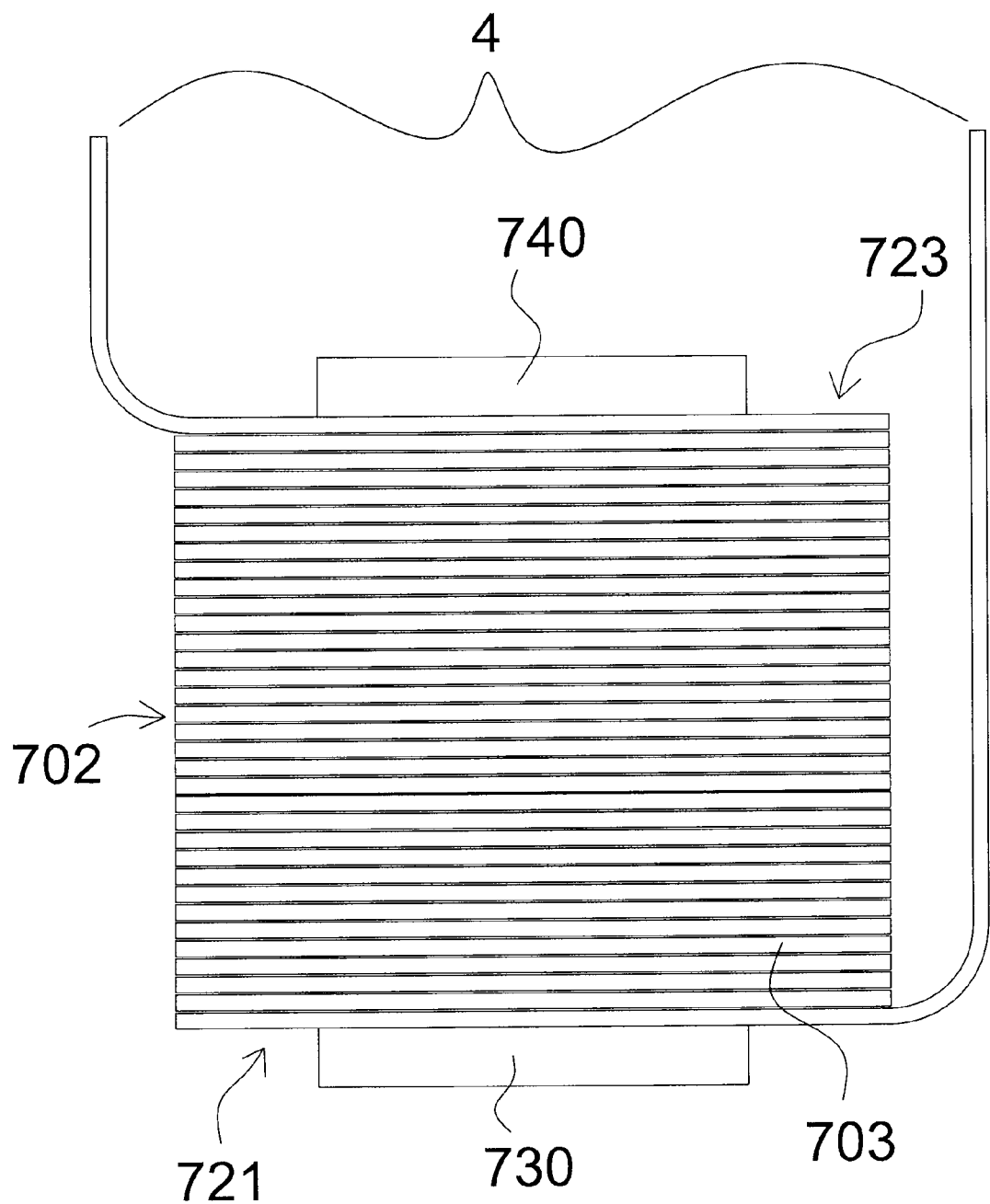
FIG. 7 comprises a top view of an example coil in accordance with various embodiments.
Figure 8:
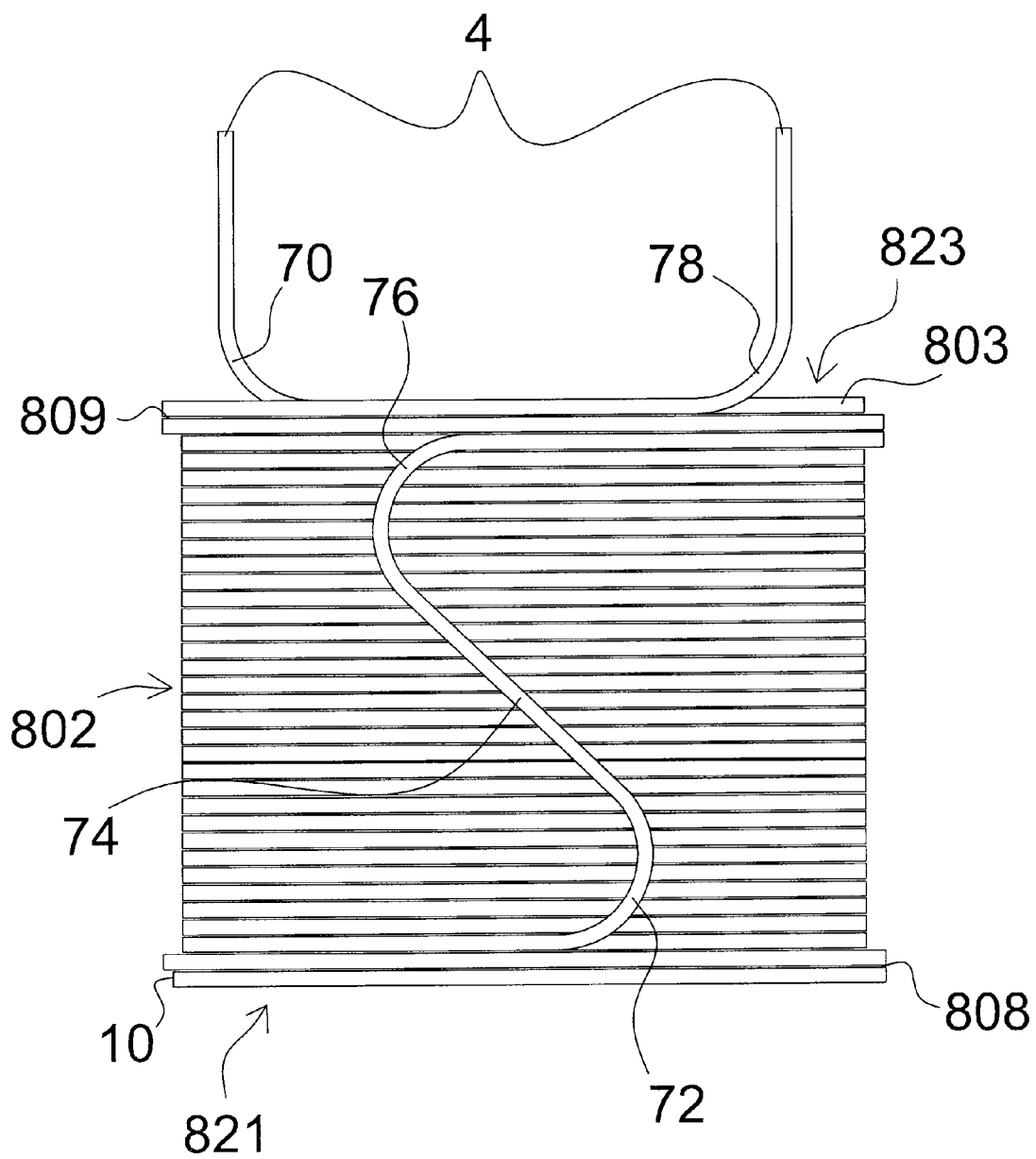
FIG. 8 comprises a top view of an example coil in accordance with various embodiments.

FIGS. 7 and 8 show other embodiments using one of the two features of the examples discussed above. The apparatus of FIG. 7 does not include a second layer of the coil. The apparatus of this approach includes a frame sized to accommodate a target device, the frame defining a first end 721 and a second end 723. A coil 702 includes a first layer 703 extending between the first end 721 and the second end 723. A first soft ferrous member 730 is disposed at least partially in the coil 702 at the first end 721 of the frame, and a second soft ferrous member 740 is disposed at least partially in the coil 702 at the second end 723 of the frame.

The apparatus of FIG. 8 does not include soft ferrous members disposed at the first and second ends of the frame. The apparatus of this approach includes a frame sized to accommodate a target device, the frame defining a first end 821 and a second end 823. A coil 802 includes a first layer 803 extending between the first end 821 and the second end 823 and a second layer consisting of a first coil portion 808 at least in part overlapping the first layer 803 at the first end 821 and a second coil portion 809 at least in part overlapping the first layer 803 at the second end 823. The remaining features discussed above may apply to either of the approaches shown in FIGS. 7 and 8.

Figure 9:
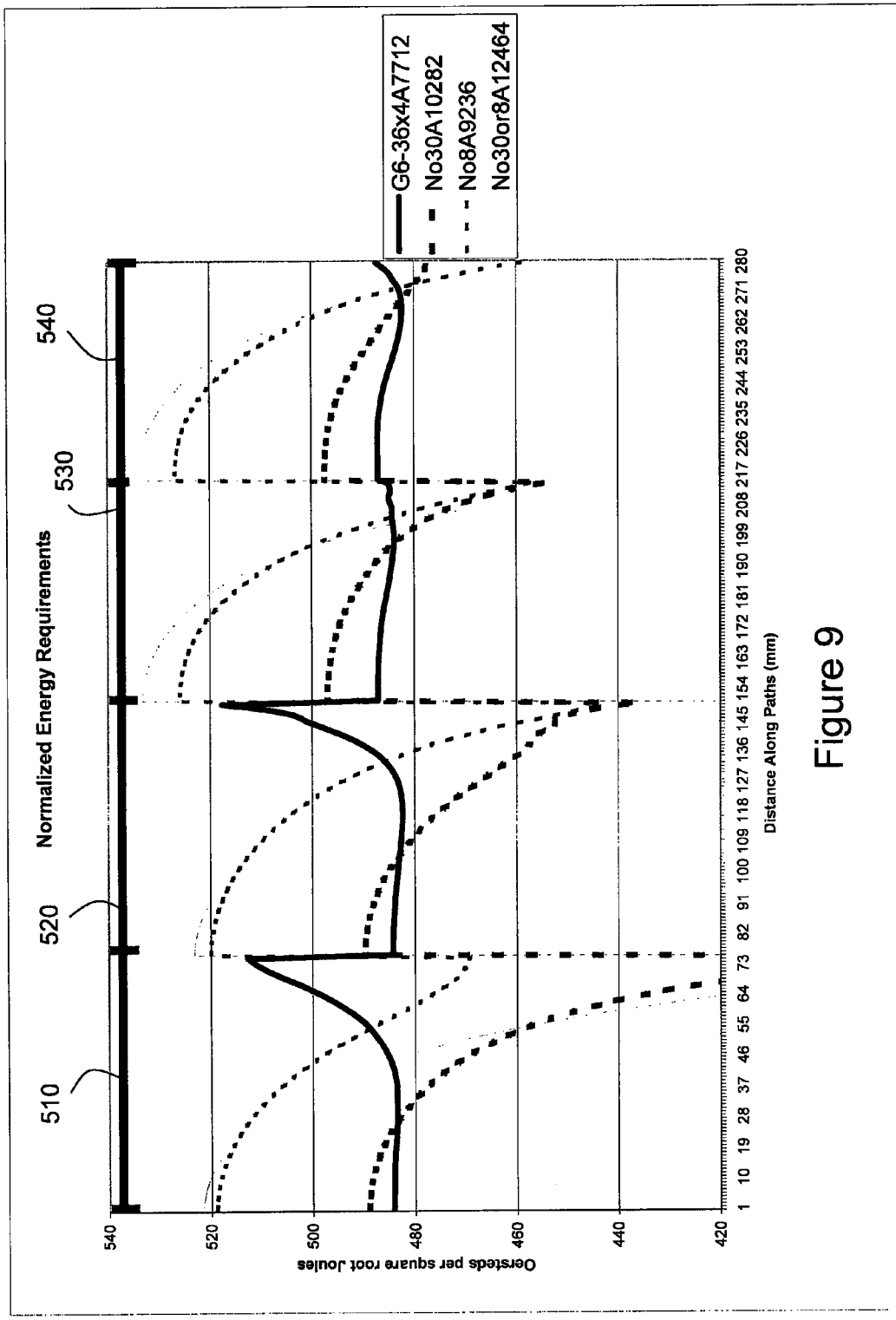
FIG. 9 comprises a representative family of normalized simulated performance curves for various example embodiments of the invention.

FIG. 9 shows simulations similar to those of FIG. 5 for certain examples of the approaches discussed with reference to FIGS. 7 and 8. Like the simulations of FIG. 5, each profile of FIG. 9 consists of simulations along four segments of the media cavity 600 described above. For each path, a minimum in the magnetic field can be determined, and the energy required to produce a 20,000 oersted magnetic field at that minimum point can be calculated.

The "G6-36×4A7712" line is the same as that of FIG. 5 described above, included to provide an understanding of scale for the reader. The "No30A10282" line shows simulated magnetic field strengths for an example having no soft ferrous members but having a wire coil configuration the same as the "G6-36×4A7712" line, with a #6 AWG wire and 36 inner turns and 4 outer turns. The graph shows that this configuration would use a 10,282 Amp current to provided the minimum field intensity. The "No8A9236" line shows simulated magnetic field strengths for an example having soft ferrous members like that of the configuration simulated in the "G6-36×4A7712" line but with no second layer on the wire coil. The graph shows that this configuration would use a 9,236 Amp current to provided the minimum field intensity. The "No30or8A12464" line shows simulated magnetic field strengths for an example no soft ferrous members and no second layer on the wire coil, essentially a simple coil using #6 AWG wire. The graph shows that this configuration would use a 12,464 Amp current to provided the minimum field intensity, which is significantly greater that those having either a second layer or soft ferrous members at the coil ends.

Typically, a power conversion device is employed to charge an energy storage capacitance from a commercial power source and, along with some switching means, to deliver that stored energy to the coil around a degaussing cavity. A direct current (DC) high voltage power supply (HVPS) is an example of a power conversion device known in the art. A HVPS may be of the efficient switching variety, or due to the intermittent nature of capacitor charging, may be from an underrated step up transformer and rectifier where winding resistances limit charging current at lower voltage.

Besides switch forward voltages, reverse leakage and the like, any energy delivery circuit experiences unwanted stray loss effects such as wire resistance, capacitor resistance, dielectric losses, hysteresis, and the effects of stray capacitance in any inductor or stray inductance of any capacitor. Specification of energy delivery circuitry suited to practical application may not explicitly depict such loss components, but it is understood that they be expected and compensated for, for example, by the preliminary storage of energy in a capacitance in excess of that quantity that causes peak magnetic field intensity. Multiple parallel components such as capacitors can multiply reduce stray effects such as a stray series resistance.

Figure 10:
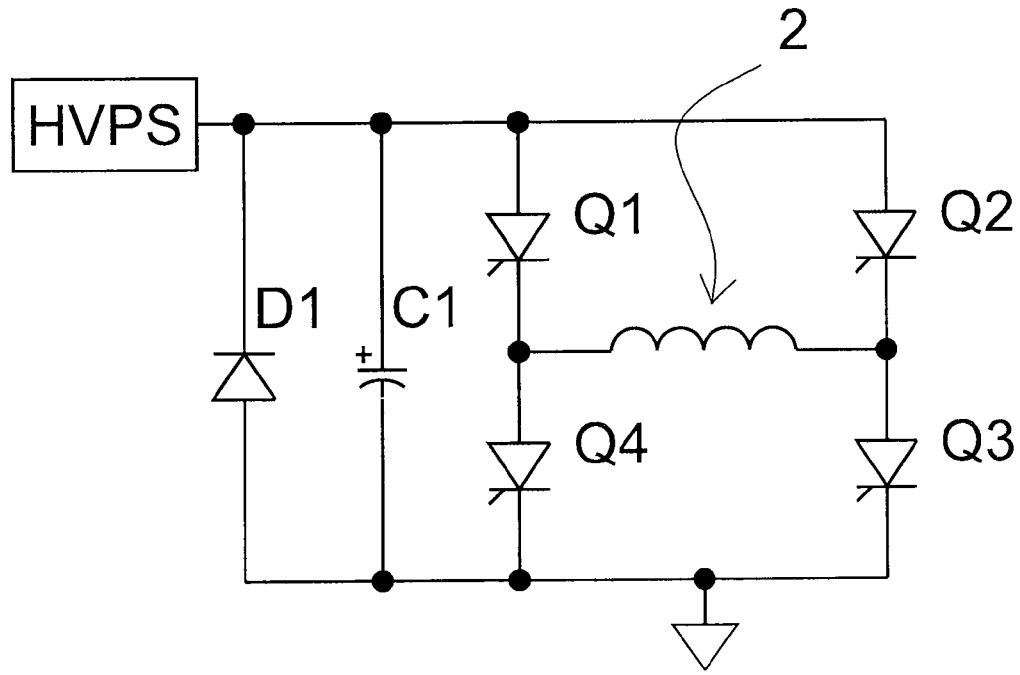
FIG. 10 comprises an example circuit diagram for use in bidirectional field generation for the example apparatus of FIGS. 1, 2, and 3.

Taking into account these effects, an example circuit is show in FIG. 10 with the coil 2 presented as an inductor situated within a conventional H-bridge of energy delivery switches Q1, Q2, Q3, and Q4. The HVPS charges capacitance C1, which may be of a high energy density polarized photoflash type as indicated by the "+" symbol. In the case of polarized capacitance and stray losses that allow an efficient under-dampened response, a diode D1 is included to help prevent damage to the circuit components. Depending on the degree of damping, D1 does not need a conduction rating of the magnitude required by the energy delivery switches. The H-bridge circuit topology is capable of equal strength reversing of the magnetic field direction generated by coil 2, first by charging C1 and switching its charge through an even (or odd) numbered pair of switches Q, and then by repeating the charge and switching the odd (or even) numbered switch pair.

Figure 11:
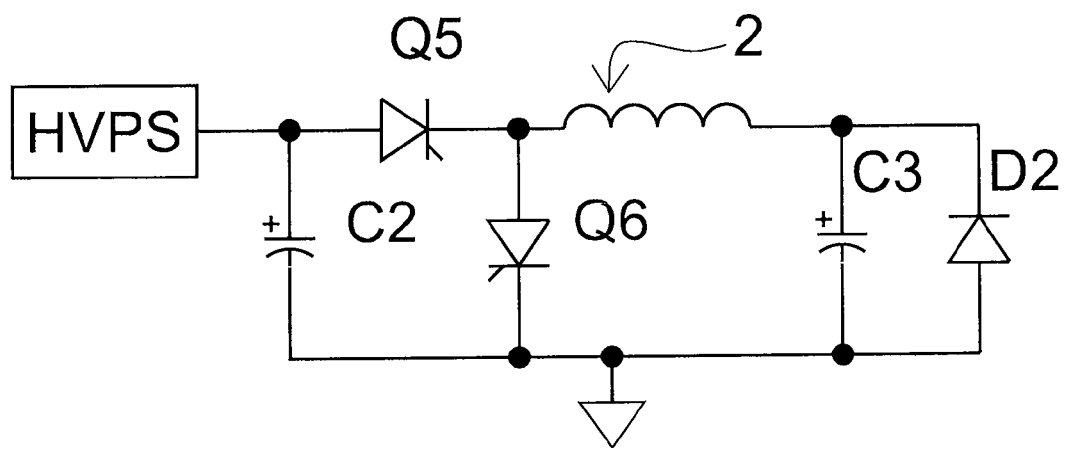
FIGS. 11, 12, and 13 comprise additional exemplary circuit diagrams for energy delivery to magnetic field coils.

Another approach to a circuit capable of field strength reversal is illustrated in FIG. 11. Initially, the HVPS charges the polarized capacitance C2 while the polarized capacitance C3 remains uncharged and the thyristor switches Q5 and Q6 are in a nonconductive state. Next, thyristor switch Q5 switches the initial charge of capacitance C2 through the coil 2, thereby charging the polarized capacitance C3. This operation constitutes a period of energy recovery as well as magnetic field generation. During that Q5-on/Q6-off period, the capacitances C2 and C3 act in series, so that their total is less than the value of either acting alone. As a result, the circuit operates in a relatively high impedance state, which tends to reduce the current flow available to generate magnetic field intensity. In this approach, the value of the capacitance C2 is generally greater than the value of the capacitance C3, and in one approach, approximately 50% higher, such as having capacitances of 36 mF and 24 mF respectively. Other values are appropriate in various approaches.

With continuing reference to the example circuit of FIG. 11, immediately after the discharge of the capacitance C2, the thyristor switch Q5 commutates to its nonconductive off state. Anytime and preferably immediately thereafter, the thyristor switch Q6 can be made conductive to discharge the capacitance C3 though the coil 2 in a current direction opposite that caused by the capacitance C2 discharge thereby creating a reverse magnetic direction. Because the thyristor switch Q6 shorts the capacitance C2-Q5(off) circuit, the capacitance of the thyristor switch Q6 has no effect on operation during this second conduction period and the circuit impedance is relatively reduced. Even though losses prevent the capacitance C3 from charging to the initial stored energy of the capacitance C2, component values can allow an even greater magnetization current to result in the coil 2 during the second discharge. Like the diode D1 in the circuit of FIG. 10, a diode D2 protects the polarized capacitance from reverse voltage.

Compared to an H-bridge, the circuit of FIG. 11 provides a higher capacitance cost but a lower switch cost. Lacking a ground connection, the thyristor switch Q5 operates with an activation complexity like that of switches Q1 and Q2. Because the HVPS charges one capacitance once per cycle, operation time can be speeded.

Figure 12:
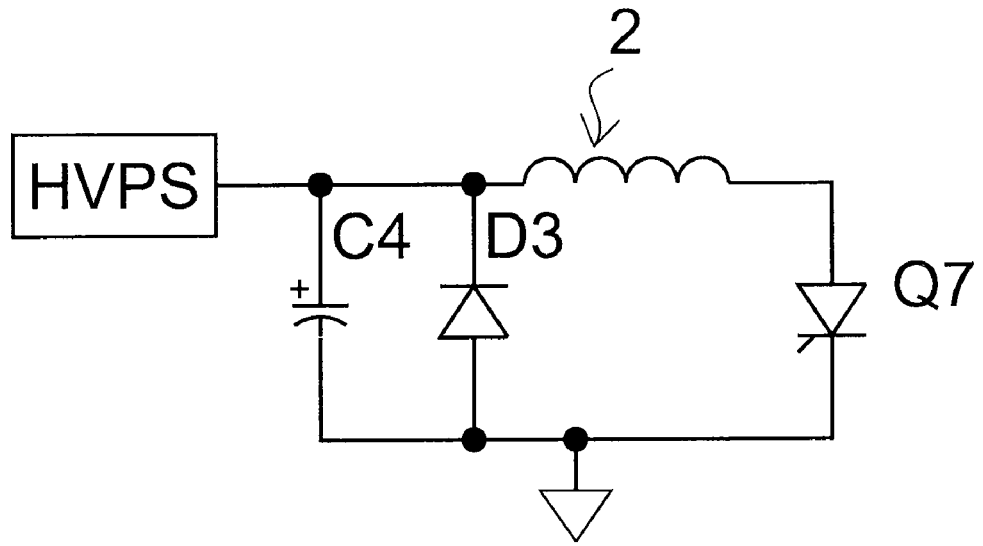

The more simple energy delivery circuit of FIG. 12 offers less capacitance and switch cost, but cannot reverse the current direction through coil 2. It provides a desired ground connection for thyristor Q7. Diode D3 allows capacitance C4 to be of a desired polarized type, but if losses are low, its conduction rating must approach that of Q7. Semiconductors packaged in the so called "hockey puck" or capsule style are appropriate. Three terminal modules that contain both Q7 and D3 are well known in the art to reduce mounting and interconnection complexity.

Figure 13:
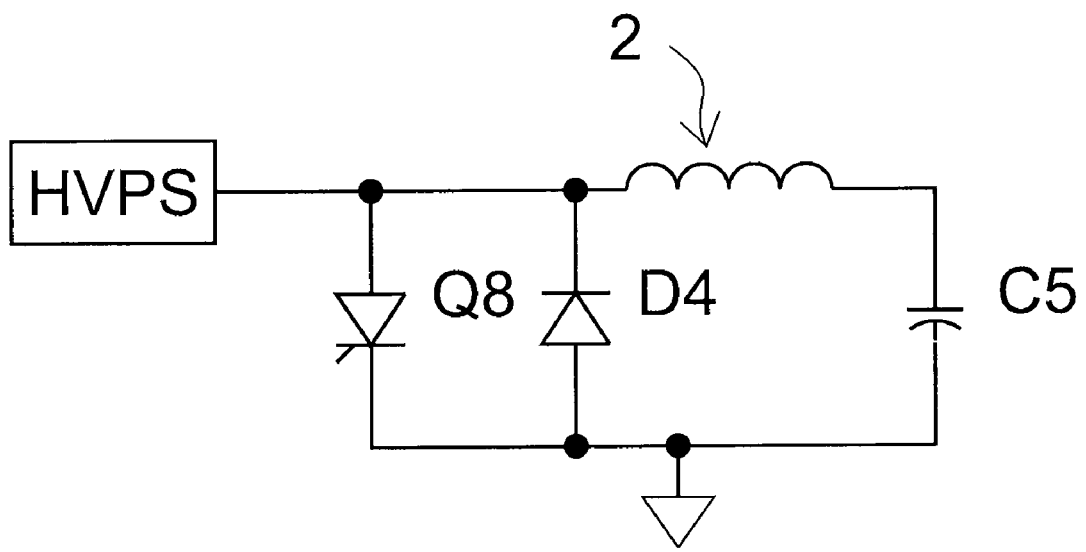

Still another approach to an energy delivery circuit is shown in FIG. 13. This approach uses an unpolarized capacitance C5, which may comprise back to back multiples of the polarized electrolytic type of capacitor. By another approach, a film type capacitor can be used that causes an energy storage density penalty greater than that of the example circuits of FIG. 10 and FIG. 11. While the thyristor switch Q8 conducts current, the capacitance C5 discharges in a first direction through the coil 2. The capacitance C5 next partially recharges during a period of lowering current. The thyristor switch Q8 commutates off when the initial current approaches zero, and then the capacitance C5 discharges a current through the coil 2 and the diode D4 in a direction opposite of the first discharge, again partially charging the capacitance C5.

Due to losses, the second opposite magnetizing current cannot be as large as a first discharge current. Advantageously, following the two capacitance C5 discharges and subsequent partial recharge, the capacitance C5 recovers a significant quantity of stored energy. Accordingly, the HVPS in this approach can be selected to have lesser energy output. A first complete cycle of charging and discharging will be made relatively longer, but if operated toward continuous duty, the recovered energy can allow shorter subsequent cycle times compared with embodiments having a larger HVPS to completely recharge a capacitance on each operational cycle.

Those skilled in the art will recognize that a wide variety of modifications, alterations, and combinations can be made with respect to the above described embodiments without departing from the scope of the invention. For example, the frame can be adapted operate as a "drop through" design without a tray, where the media pathway allows for a target medium to be "dropped through" the degaussing cavity, with retractable ferrous members serving as the stops for media containment within the cavity. The cavity size can be designed to accommodate stacks of media to be degaussed by winding a nearly rectangular or ovate coil of a length and width just greater than the media width and length, thereby increasing throughput of the apparatus. Such as approach may employ nearly square, rectangular, or even circular coil windings. Other approaches may improve efficiency by allowing a higher ratio of media volume to volume of the frame. Such modifications, alterations, and combinations are to be viewed as being within the ambit of the inventive concept.

What is claimed is:

1. An apparatus for applying a magnetic field to a data storage device, the apparatus comprising:

a frame sized to accommodate a target device, the frame defining a first end and a second end;
a coil comprising:
a first layer extending between the first end and the second end,
a second layer consisting of a first coil portion at least in part overlapping the first layer at the first end and a second coil portion at least in part overlapping the first layer at the second end;
a first soft ferrous member disposed at least partially in the coil at the first end of the frame;
a second soft ferrous member disposed at least partially in the coil at the second end of the frame.

2. The apparatus of claim 1 wherein the coil comprises a single wire.

3. The apparatus of claim 1 further comprising a tray configured to slidably engage the frame, wherein the tray comprises stainless steel bottom and sides and wherein the first soft ferrous member is disposed at a first end of the tray.

4. The apparatus of claim 3 comprising an actuation member connected to the tray and configured to engage a switch, the switch configured to allow electrical operation of the coil when engaged by the actuation member.

5. The apparatus of claim 1 wherein the first ferrous member and the second ferrous member comprise at least one of steel or stacked laminations of silicon steel.

6. A method comprising:
receiving a target device in a frame sized to accommodate the target device, the frame defining a first end and a second end;
applying a current to a coil disposed around the frame, the coil comprising:
a first layer extending between the first end and the second end,
a second layer consisting of a first coil portion at least in part overlapping the first layer at the first end and a second coil portion at least in part overlapping the first layer at the second end;
whereby the coil applies a substantially uniform magnetic field to the target device.

7. The method of claim 6 wherein a first soft ferrous member is disposed at least partially in the coil at the first end of the frame and a second soft ferrous member disposed at least partially in the coil at the second end of the frame such that the applying a current to the coil.

8. An apparatus comprising:
a means for receiving a target device in a frame sized to accommodate the target device, the frame defining a first end and a second end;
a means for applying a current to a coil disposed around the frame, the coil comprising:
a first layer extending between the first end and the second end,
a second layer consisting of a first coil portion at least in part overlapping the first layer at the first end and a second coil portion at least in part overlapping the first layer at the second end.

9. The apparatus of claim 8 further comprising a first soft ferrous member disposed at least partially in the coil at the first end of the frame and a second soft ferrous member disposed at least partially in the coil at the second end of the frame.

10. An apparatus for applying a magnetic field to a data storage device, the apparatus comprising:
a frame sized to accommodate a target device, the frame defining a first end and a second end;
a coil comprising a first layer extending between the first end and the second end,
a first soft ferrous member disposed at least partially in the coil at the first end of the frame;
a second soft ferrous member disposed at least partially in the coil at the second end of the frame.

11. The apparatus of claim 10 further comprising a tray configured to slidably engage the frame, wherein the tray comprises stainless steel bottom and sides and wherein the first soft ferrous member is disposed at a first end of the tray.

12. The apparatus of claim 11 further comprising an actuation member connected to the tray and configured to engage a switch, the switch configured to allow electrical operation of the coil when engaged by the actuation member.

13. The apparatus of claim 10 wherein the first ferrous member and the second ferrous member comprise at least one of steel or stacked laminations of silicon steel.

14. An apparatus for applying a magnetic field to a data storage device, the apparatus comprising:
a frame sized to accommodate a target device, the frame defining a first end and a second end;
a coil comprising:
a first layer extending between the first end and the second end,
a second layer consisting of a first coil portion at least in part overlapping the first layer at the first end and a second coil portion at least in part overlapping the first layer at the second end.

15. The apparatus of claim 14 wherein the coil comprises a single wire.

16. The apparatus of claim 14 further comprising a tray configured to slidably engage the frame, wherein the tray comprises stainless steel bottom and sides.

17. The apparatus of claim 16 comprising an actuation member connected to the tray and configured to engage a switch, the switch configured to allow electrical operation of the coil when engaged by the actuation member.

* * * * *